June 3, 1924.

D. G. SELL

DRIP COFFEE URN

Filed Aug. 13, 1923   2 Sheets-Sheet 1

1,496,493

Inventor
Daniel G. Sell

By Philip A. H. Serell
Attorney

June 3, 1924.

D. G. SELL

DRIP COFFEE URN

Filed Aug. 13, 1923

Inventor
Daniel G. Sell
By Philip A. H. Sewell
Attorney

Patented June 3, 1924.

1,496,493

UNITED STATES PATENT OFFICE.

DANIEL G. SELL, OF KANSAS CITY, MISSOURI.

DRIP-COFFEE URN.

Application filed August 13, 1923. Serial No. 657,063.

*To all whom it may concern:*

Be it known that DANIEL G. SELL, a citizen of the United States, residing at Kansas City, in the county of Jackson and State of Missouri, has invented certain new and useful Improvements in Drip-Coffee Urns, of which the following is a specification, reference being had therein to the accompanying drawings.

The invention relates to drip coffee urns, and has for its object to provide a device of this character particularly adapted for use in lunch rooms, and has for its object to provide a device of this character formed from a plurality of sections, detachably connected and superimposed adapted to be supported above the burner on a stove. The device comprises a water receptacle, on the upper side of which is supported a warming receptacle, around the inner chamber of which the steam from the water receptacle passes upwardly around a second water receptacle and thence into engagement with a condensation plate located above a coffee receiving bag supported on the upper end of a second water receiving receptacle. The water condensed on the plate drops downwardly into the coffee bag and percolates therethrough into the second water receiving receptacle thereby forming coffee.

A further object is to provide a cold water receptacle, the bottom of which is formed by the condensation plate, thereby insuring rapid condensation as the steam comes into engagement with said plate. Also to provide means whereby excess steam may escape to the atmosphere.

A further object is to provide means whereby additional water may be supplied to the water receiving receptacles, and to provide faucet means whereby liquid from the water receiving receptacles may be drawn. Also to provide the lower receptacle with a drainage pipe which carries the faucet and which drainage pipe extends into the lower receptacle to a position above the stove burner, thereby insuring maximum heating of the water as it is drawn from the receptacle.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 4:
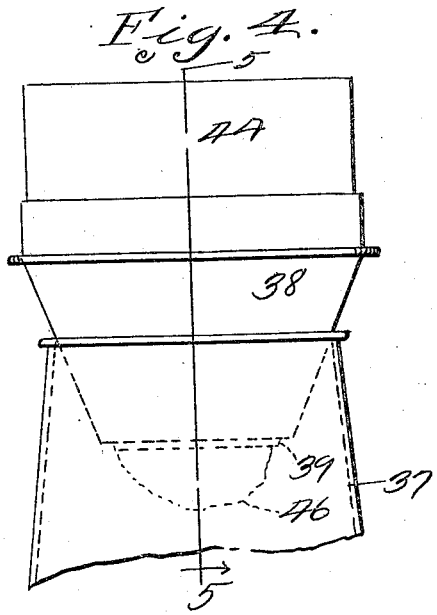
Figure 4 is a side elevation of the modified form of coffee making device showing the same supported on a coffee pot.
Figure 1:
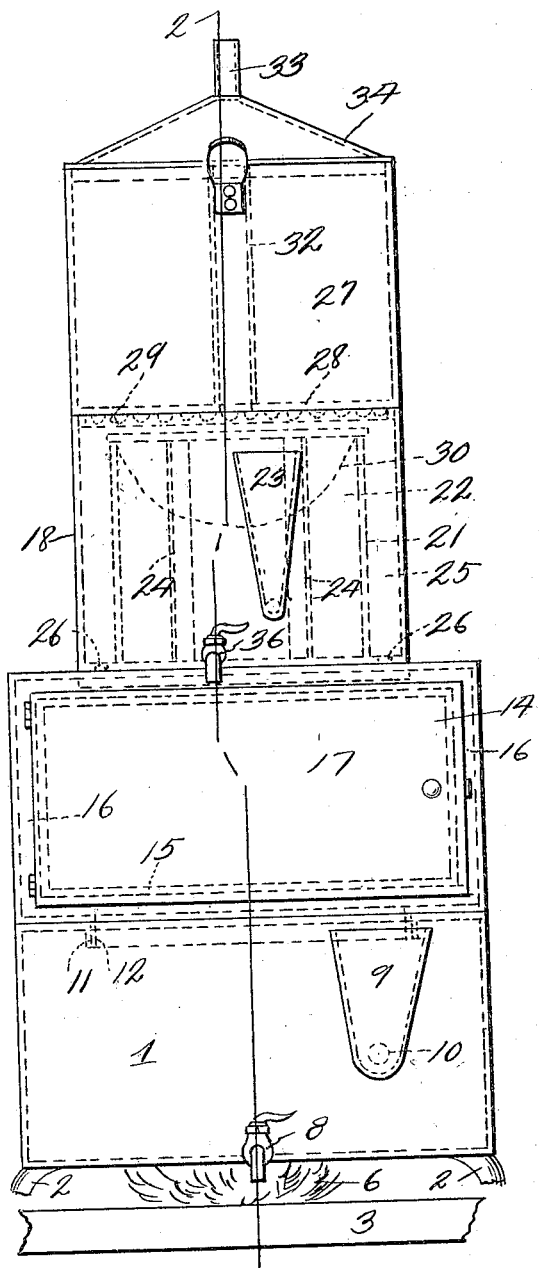
Figure 1 is a front elevation of the urn.

Referring to the drawing, the numeral 1 designates a rectangular shaped hot water receptacle, which receptacle is provided with supporting legs whereby when it is placed on the top of the stove 3 it will be spaced above the stove burner 4 so that the flame 6 thereof will engage its bottom for heating the water within the receptacle. The water within the receptacle may be used for various purposes and is drawn therefrom through a pipe 7 which extends into the receptacle above the blaze 6, whereby it will be thoroughly heated as its leaves the receptacle. Secured to the outer end of the pipe 7 is a faucet 8 adapted to be opened for drawing the water from the receptacle, however the faucet 8 is disposed to the outside of the stove 3 so that a receptacle may be easily held thereunder. When it is desired to add to the water within the receptacle 1, water may be poured through the pockets 9 and will enter the receptacle through the port 10. The upper side of the receptacle 1 is provided with a flanged opening 11, which receives the annular flange 12 carried by the lower wall 13 of a warming chamber 14, which warming chamber is provided with a spaced wall 15, thereby forming a steam passage 16 around the chamber, whereby steam generated within a water receptacle 1 may pass upwardly around the warming chamber thereby heating articles, which are being warmed within the chamber 14. The warming chamber 14 is provided with a door 17 at its forward end, whereby access may be had thereto for placing articles therein or removing the same. Superimposed on the upper side of the warming chamber is a coffee brewing receptacle 18, which receptacle has its lower side provided with a flange 19 which is received within the flanged opening 20 in the upper side of the warming chamber 14. The brewing receptacle is provided with a segmentally shaped wall 21 spaced from the outer wall thereof, thereby forming a water receiving chamber 22, into which water may be poured through the pocket 23. The ends of the segmentally shaped wall 21 are provided with radially disposed walls 24, which are connected to the outer wall of the brewing receptacle 18 and form a segmentally shaped chamber 25 around the water chamber 22 and into which chamber 25 steam passes through the apertures 26 in the bottom of the chamber 25, thereby heating the water within the chamber 22 as the steam passes upwardly through the segmentally shaped chamber 25. Detachably supported on the upper end of the brewing receptacle 18 is a cold water receptacle 27, in which receptacle cold water is placed. The bottom 28 of the cold water receptacle 27 is provided with a plurality of downwardly struck lugs 29 disposed above a removable coffee receiving bag 30 supported on the upper end of the segmentally shaped wall 21, and the steam passes upwardly into engagement with said lugs 29 and condenses and drops from said lugs into the ground coffee 31 in the bag 30. The cold water within the receptacle 27 insures a rapid condensation of the steam. As the water drops from the lugs 29 into the ground coffee 31, it percolates through the coffee and bag 30 into the water within the coffee brewing receptacle 18 thereby forming coffee. The excess steam generated in the device passes upwardly through the pipe 32, which extends above the water level within the water receptacle 27 and thence to the atmosphere through the pipe 33 carried by the removably conical shaped cover 34, which cover if so desired may be used as a funnel.

Connected to the brewing receptacle 18 at a point intermediate the walls 24 is a pipe 35, which pipe extends outwardly beyond the forward side of the forming chamber 14 and is provided with a faucet 36 by means of which coffee brewed within the brewing receptacle 18 may be drawn and served.

Figure 5:
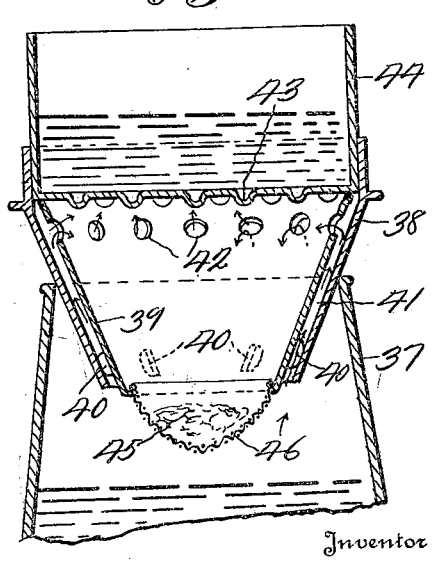
Figure 5 is a vertical transverse sectional view taken on line 5—5 of Figure 4.
Figures 2, 3:
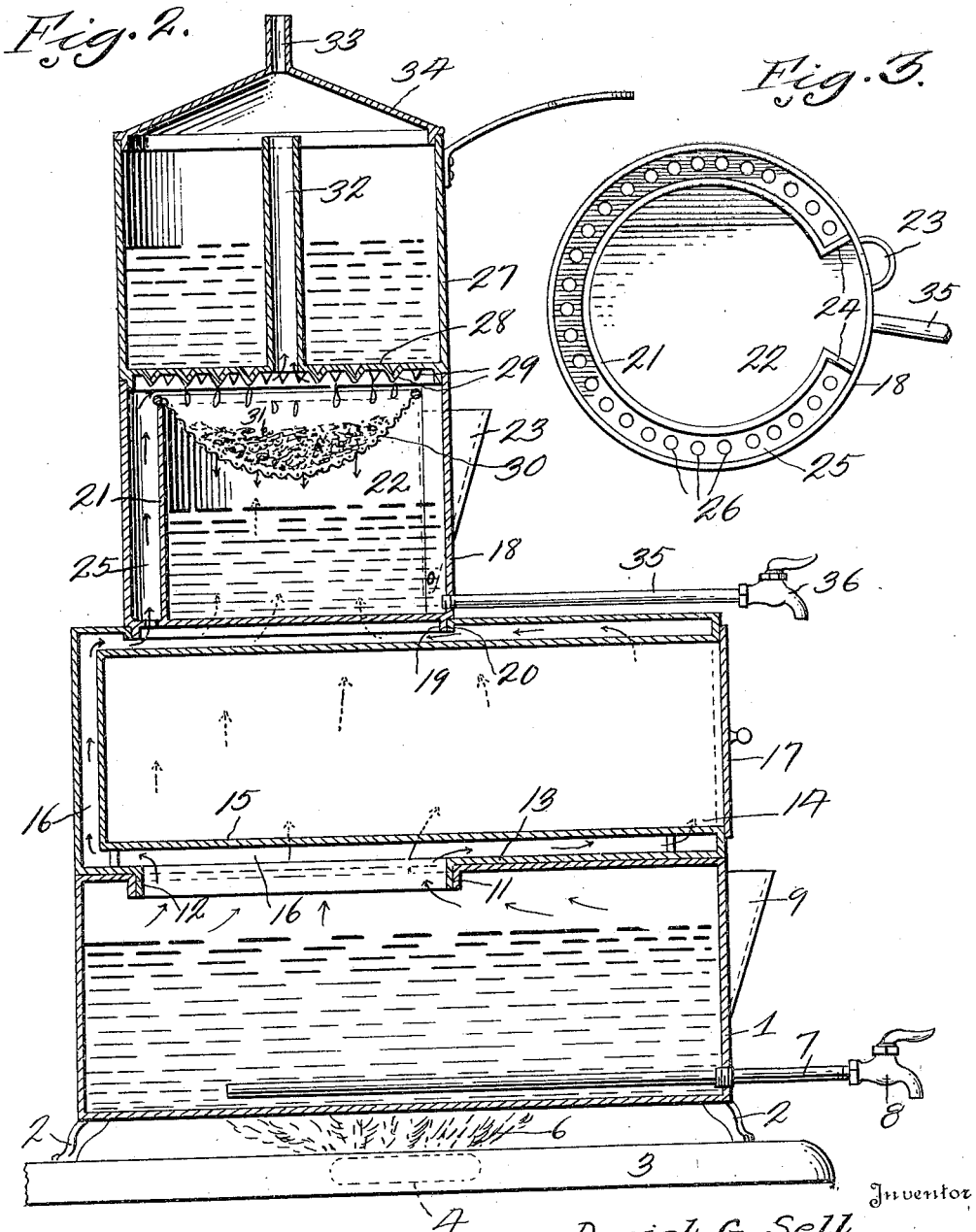
Figure 2 is a vertical transverse sectional view through the urn taken on line 2—2 of Figure 1.
Figure 3 is a top plan view of the coffee bag receiving receptacle.

Referring to Figures 4 and 5 wherein a modified form of device is shown and one adapted to be supported on a coffee pot 37, the device comprises a conically shaped member 38 adapted to be supported within the upper end of the coffee pot and by being conically shaped will be received in coffee pots of different sizes. Disposed within the conically shaped member 38 is a conically shaped member 39, which is held spaced from the inner wall of the member 38 by means of lugs 40, thereby forming a steam passage 41 through which steam generated within the coffee pot 37 may pass upwardly and through apertures 42 into engagement with the lugs 43 of the cold water receptacle 44, where the steam condenses and drops downwardly into the coffee 45 in the removable coffee bag 46 supported in the lower end of the conically shaped member 39, thereby percolating through the coffee 45 and bag 46 into the water within the coffee pot 37.

From the above it will be seen that a coffee urn is provided, wherein coffee may be quickly made and will be free from grounds, will not be bitter, and one wherein the steam generated from a water tank is utilized for heating a warming chamber as well as brewing coffee.

The invention having been set forth what is claimed as new and useful is:—

1. A coffee making utensil comprising a steam generating receptacle, a coffee brewing receptacle above the steam generating receptacle, a segmentally shaped partition in the coffee brewing receptacle, thereby forming a water receiving chamber and a segmentally shaped steam passage around the segmentally shaped partition, a coffee receiving bag supported on the upper end of the partition and a condensation member above the bag.

2. A coffee making utensil comprising a steam generating receptacle, a coffee brewing receptacle supported on the steam generating receptacle and having a water receiving chamber and a segmentally shaped steam passage around the chamber, said water receiving chamber and segmentally shaped steam passage being formed by a segmentally shaped partition, a cold water receptacle detachably supported on the upper end of the coffee brewing receptacle, lugs carried by the bottom of the cold water receptacle, and a coffee receiving bag detachably supported on the upper end of the partition below the lugs of the cold water receptacle.

3. A coffee making utensil comprising a steam generating receptacle, a warming chamber detachably supported on the upper side of the steam generating receptacle and having a steam passage around the chamber therein and in communication with the steam generating receptacle, a coffee brewing receptacle detachably supported on the upper side of the warming chamber and having a segmentally shaped steam passage in communication with the steam passage of the warming chamber and a water receiving chamber, a coffee receiving bag supported above the water receiving chamber, a cold water receiving receptacle detachably supported on the upper end of the coffee brewing receptacle, and lugs carried by the lower side of the cold water receptacle and disposed above the coffee receiving bag.

4. The combination with a coffee brewing device, said device comprising a coffee brewing receptacle, a condensation receptacle supported on the coffee brewing receptacle, of a segmentally shaped partition in the coffee brewing receptacle, said partition having its ends connected to the wall of the coffee brewing receptacle thereby forming the segmentally shaped steam passage around the partition, a coffee receiving bag supported on the upper end of the partition, and a steam generating receptacle below the coffee brewing receptacle.

5. A coffee making device comprising a steam generating receptacle, a warming chamber supported on the steam generating receptacle, a coffee brewing receptacle supported on the warming chamber and having a central chamber and a segmentally shaped chamber, passages of communication between the segmentally shaped chamber and the steam generating receptacle, a coffee receiving bag disposed within the central chamber of the coffee brewing receptacle, and a condensation receptacle detachably supported on the coffee brewing receptacle above the coffee receiving bag.

6. A coffee making utensil comprising an elongated hot water receptacle adapted to be disposed on a stove over a blaze, a pipe extending into said receptacle to a position of the blaze, a faucet carried by said pipe, means for supplying water to said hot water receptacle, a warming chamber detachably supported on the upper side of the hot water receptacle and having a passage of communication with the hot water receptacle, a coffee brewing device detachably supported on the upper side of the warming chamber and having a centrally disposed water receiving chamber and a segmentally shaped steam chamber in communication with the chamber of the hot water receptacle through the water chamber, a coffee receiving bag above the central chamber, a detachable condensation receptacle on the upper end of the brewing receptacle above the coffee bag, a faucet in connection with the central chamber of the brewing receptacle, means whereby water may be supplied to the central chamber from the outside of the brewing receptacle and a removable cover carried by the condensation receptacle.

In testimony whereof I hereunto affix my signature.

DANIEL G. SELL.